United States Patent Office 3,698,881
Patented Oct. 17, 1972

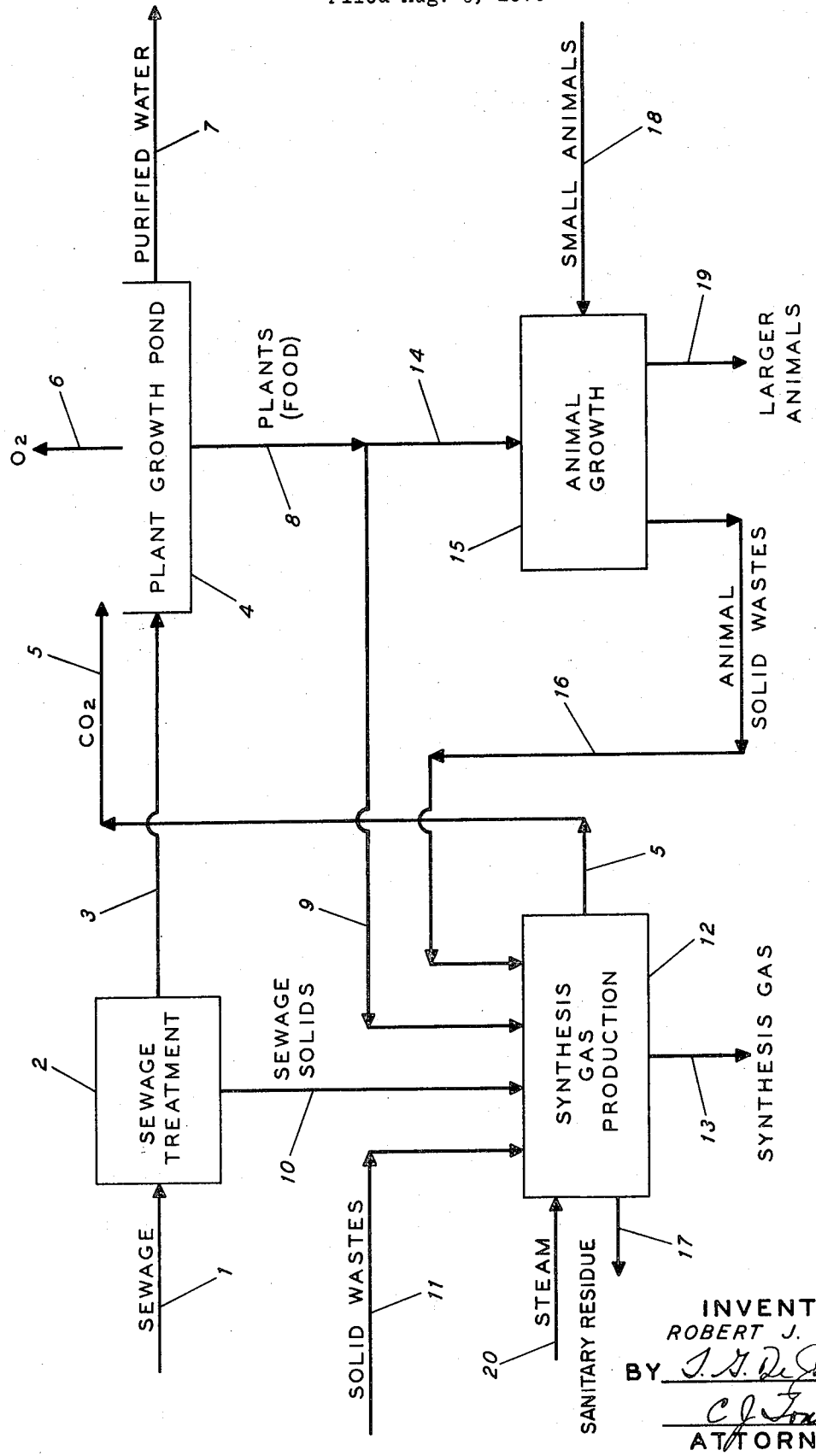

3,698,881
SYNTHESIS GAS PRODUCTION
Robert J. White, Pinole, Calif., assignor to Chevron Research Company, San Francisco, Calif.
Continuation-in-part of applications Ser. No. 34,834, May 5, 1970, and Ser. No. 39,116, May 20, 1970. This application Aug. 5, 1970, Ser. No. 62,234
Int. Cl. A01h *13/00;* A23k *1/00;* C10j *3/00*
U.S. Cl. 48—209         10 Claims

ABSTRACT OF THE DISCLOSURE

A process for producing synthesis gas which comprises separating solid material and an aqueous stream containing inorganic nutrients from sewage, using the aqueous stream as a source of nutrients to aid in growing plants, and reacting at least a portion of the plants and at least a portion of the solid material separated from the sewage with steam in a reaction zone to produce synthesis gas. According to a preferred embodiment, a portion of the plants which are grown are fed to animals and solid wastes from the animals are used as feed for synthesis gas production.

CROSS REFERENCES

This application is a continuation-in-part of application Ser. No. 34,834, filed May 5, 1970, entitled "Catalytic Hydrogen Manufacture," and application Ser. No. 39,116, filed May 20, 1970, entitled "Hydrogen Manufacture."

BACKGROUND OF THE INVENTION

The present invention relates to the production of synthesis gas and plants. More particularly, the present invention relates to the production of synthesis gas and hydrogen-containing gases by the reaction of carbonaceous material with steam, and to the purification of sewage treatment plant effluent aqueous streams.

The term "plants" is used herein to include any of numerous organisms constituting the kingdom of Plantae and typically having cell walls composed of cellulose in large part and having a nutritive system in which carbohydrates are formed photosynthetically.

The term "synthesis gas" is used herein to mean a gas comprising hydrogen, carbon monoxide and carbon dioxide.

Synthesis gas can be used for a number of purposes, for example, the carbon oxides can be removed from the synthesis gas, usually after converting essentially all of the carbon monoxide to hydrogen and carbon dioxide, and the resulting purified hydrogen gas used in hydroconversion processes such as hydrocracking to produce jet fuel or gasoline. The synthesis gas can also be used to synthesize methanol from the hydrogen and carbon oxides or to synthesize other chemicals such as ammonia when nitrogen is added to the synthesis gas either after production of the synthesis gas or preferably during the reaction used to produce the synthesis gas. The synthesis gas can be used in a Fischer Tropsch synthesis to form liquid hydrocarbons. Also, the synthesis gas can be used to form methane or it can be burned directly as a fuel gas or it can be combined with light hydrocarbons to form a fuel gas, usually after removal of at least part of the carbon oxides or a conversion of carbon monoxide to carbon dioxide.

Various methods have been suggested for the production of synthesis gas or hydrogen-rich gas mixtures. Among these methods are steam-hydrocarbon reforming, partial oxidation of hydrocarbons, Lurgi heavy hydrocarbons gasification, the traditional steam, red-hot coke reaction, and modified methods of reacting carbonaceous matter with steam and oxygen, such as described in U.S. Pat. 1,505,065.

The two leading processes, that is, the two processes which are most frequently used to generate hydrogen, are steam-hydrocarbon reforming and partial oxidation of hydrocarbons.

In typical steam reforming processes, hydrocarbon feed is pretreated to remove sulfur compounds which are poisons to the reforming catalyst. The desulfurized feed is mixed with steam and then is passed through tubes containing a nickel catalyst. While passing through the catalyst-filled tubes, most of the hydrocarbons react with steam to form hydrogen and carbon oxides. The tubes containing the catalyst are located in a reforming furnace, which furnace heats the reactants in the tubes to temperatures of 1200°–1700° F. Pressures maintained in the reforming furnace tubes range from atmospheric to 450 p.s.i.g. If a secondary reforming furnace or reactor is employed, pressures used for reforming may be as high as 450 p.s.i.g. to 700 p.s.i.g. In secondary reformer reactors, part of the hydrocarbons in the effluent from the primary reformer is burned with oxygen. Because of the added expense, secondary reformers are generally not used in pure hydrogen manufacture, but are used where it is desirable to obtain a mixture of $H_2$ and $N_2$, as in ammonia manufacture. The basic reactions in the steam reforming process are:

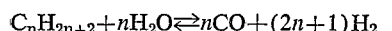
$$C_nH_{2n+2} + nH_2O \rightleftharpoons nCO + (2n+1)H_2$$

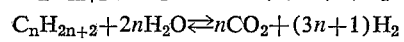
$$C_nH_{2n+2} + 2nH_2O \rightleftharpoons nCO_2 + (3n+1)H_2$$

e.g., methane-steam:

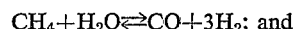
$$CH_4 + H_2O \rightleftharpoons CO + 3H_2; \text{ and}$$

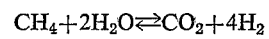
$$CH_4 + 2H_2O \rightleftharpoons CO_2 + 4H_2$$

In typical partial oxidation processes, a hydrocarbon is reacted with oxygen to yield hydrogen and carbon monoxide. Insufficient oxygen for complete combustion is used. The reaction may be carried out with gaseous hydrocarbons or liquid or solid hydrocarbons, for example, with methane, the reaction is:

$$C_7H_{12} + 2.8O_2 + 2.1H_2O \rightleftharpoons 6.3CO + .7CO_2 + 8.1H_2$$

With heavier hydrocarbons, the reaction may be represented as follows.

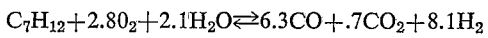
$$C_7H_{12} + 2.8O_2 + 2.1H_2O \rightleftharpoons 6.3CO + .7CO_2 + 8.1H_2$$

Both catalytic and noncatalytic partial oxidation processes are in use. Suitable operating conditions include temperatures from 2000° F. up to about 3200° F. and pressures up to about 1200 p.s.i.g., but generally pressures between 100 and 600 p.s.i.g. are used. Various specific partial oxidation processes are commercially available, such as the Shell Gasification Process, Fauser-Montecatini Process, and the Texaco Partial Oxidation Process.

There is substantial carbon monoxide in the hydrogen-rich gas generated by either reforming or partial oxidation. To convert the carbon monoxide to hydrogen and carbon dioxide, one or more CO shift conversion stages are typically employed. The CO shift conversion reaction is:

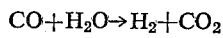
$$CO + H_2O \rightarrow H_2 + CO_2$$

This reaction is typically effected by passing the carbon monoxide and $H_2O$ over a catalyst such as iron oxide activated with chromium.

U.S. Pat. 3,471,275 discloses a method for converting refuse or garbage-type material to pases such as gases rich in hydrogen. According to the present process disclosed in U.S. Pat. 3,471,275, the refuse is fed to a retort and heated therein to a temperature between about 1650° F. and 2200° F. The retort is externally heated. According to the '275 patent process, steam is not generally added to the retort. Any steam which is added to the retort according to the process disclosed in the '275 patent is added to the bottom of the retort so that steam would flow countercurrent to the waste material which is introduced to the retort at the top of the retort. No catalyst is used in the '275 patent process.

The present invention is concerned with the production of synthesis gas or hydrogen from solids present in sewage material and also is concerned with the purification of aqueous effluent stream from sewage treatment plants. Particularly, the present invention is concerned with sewage treatment plant effluent aqueous streams which contain inorganic impurities.

The inorganic impurities (such as nitrates, $NO_3^=$; phosphates, $PO_4^\equiv$) in sewage treatment plant effluent aqueous streams are not removed in typical sewage treatment plants having primary and secondary treatment steps. The inorganic materials present in the aqueous effluent streams from sewage treatment plants having only primary and secondary treatment facilities are often undesirable per se because of their relatively high content in the water and are also generally undesirable because of the various plant micro-organisms which grow in overabundance in various water bodies because of the added nitrition resulting from concentrated amounts of the inorganic nutrients in the aqueous sewage effluent stream. Micro-organisms such as algae and other botanical species grow abundantly wherever sunlight, inorganic nutrients, water, and carbon dioxide are available. In fresh water, algae are often found as green scum on rocks and also floating in the water. The algae and similar plant micro-organisms can become noticeable in lakes, making bathing disagreeable and imparting an unpleasant taste to water supplies. Thus, a large part of the current Lake Erie problem is due to overabundant micro-organism plant growth in the lake resulting from inorganic nutrients in aqueous effluent streams put into the lake.

Although tertiary treatment steps have been proposed to remove inorganic materials from aqueous streams after a primary and secondary treatment in sewage treatment plants, the tertiary treatment step is not widely applied because of the high expense of adding the third treatment step to sewage treatment plants.

SUMMARY OF THE INVENTION

According to the present invention, a process is provided for producing synthesis gas which comprises separating solid material and an aqueous stream containing inorganic nutrients from sewage, using the aqueous stream as a source of nutrients to aid in growing plants, and reacting at least a portion of the plants and at least a portion of the solid material separated from the sewage with steam in a reaction zone to produce synthesis gas.

Thus, in the present invention, solid wastes present in sewage, particularly ordinary municipal or city sewage, are converted to valuable synthesis gas and also, inorganic constituents are removed from sewage plant aqueous effluent streams in a manner which utilizes the inorganic material as nutritional material for plant growth. In the process of the present invention, preferably the sewage is subjected to primary and secondary sewage treatment. Solid material is separated from the sewage during at least the primary treatment and an aqueous stream containing inorganic nutrients is withdrawn from at least the secondary sewage treatment.

Primary sewage treatment usually is basically a settling process wherein solids or sludge type material separates out from the less dense fluid phase of the sewage. In typical sewage treatment plants, the less dense liquid phase from a primary treatment step is usually passed to a secondary treatment step for decomposition of organic materials remaining in the less dense liquid phase. The secondary treatment step can be an aerobic treatment step wherein oxygen or air is bubbled through or contacted with the liquid to aid in the decomposition of the organic material to $CO_2$ and $H_2O$. The solids which may settle out during the secondary aerobic treatment can be passed to the synthesis gas reaction zone in the process of the present invention. However, the solids or heavy sludge type material from the primary treatment step preferably provide the majority of the sewage solids fed to the synthesis reaction zone according to the process of the present invention.

In the process of the present invention, anaerobic secondary treatment usually is not preferred, partly because the decomposition products of the anaerobic treatment include undesirable constituents such as $H_2S$, $NH_3$ and light hydrocarbon gases.

One of the reactions occurring in the process of the present invention is the reaction of cellulosic material or sugar-type material with steam to produce hydrogen and carbon oxides. The cellulosic and sugar-type material can be considered on the basis of a simple sugar such as glucose for which the following reaction applies:

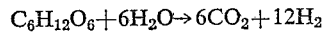

$$C_6H_{12}O_6 + 6H_2O \rightarrow 6CO_2 + 12H_2$$

Unlike a similar reaction where water is added to methane or carbon, the above reaction has a negative free energy change ($\Delta F$) at 25° C. so that, on the basis of thermodynamics, the reaction can occur at room temperatures. However, the reaction rate is very slow at room temperatures. Therefore, elevated temperatures are preferred in the reaction zone according to the process of the present invention. However, it is particularly preferred in the process of the present invention to use temperatures below 1600° F. High temperatures result in excessive heat requirements, increased reactor cost and also lower yields of hydrogen. The use of alkali metal carbonate catalysts in the process of the present invention greatly increases the reaction rate of the organic feed material with steam to form synthesis gas, making it particularly attractive to use temperatures below 1600° F. in the process of the present invention for the production of synthesis gas. Thus, preferably, the contacting of the organic feed material with the steam is carried out in a reaction zone at a temperature between about 500 and 1600° F. and more preferably, between about 700 and 1600° F. Temperatures between 800 and about 1200 or 1400° F. are particularly preferred. At these temperatures, we have found that the reaction of organic feed material (such as sewage solids) with steam is a surprisingly attractive route to produce hydrogen-rich gas, with relatively high $H_2$ yields and relatively low heat requirements. Temperatures between 500 and 3000° F. are operable in the process of present invention but temperatures below 1600° F. are preferred for the reasons given above.

The process of the present invention can be carried out over a wide range of pressures from about 1 atmosphere to 200 atmospheres. According to a particularly preferred embodiment of the present invention, the pressure in the reaction zone is maintained between about 30 and 150 atmospheres. We have found that these high pressures are particularly advantageous in the reaction of solid waste material with steam while the reaction zone is maintained at a temperature between about 500 and 1600° F. Because the reaction of solid waste material with steam has been found to be fairly rapid compared, for example, to the reaction of coke or carbon with steam, a substantial rate of production of hydrogen from solid waste material can be obtained at relatively high pressures including pressures ranging from about 500 or 1000 p.s.i.g. up to about 2000 or 3000 p.s.i.g. The relatively low temperatures preferred in the process of the present invention, i.e., temperatures below 1600° F. and more preferably below 1400° F. are important in the preferred embodiment of the present invention wherein high pressures are used in the reaction zone. The lower temperatures result in considerable savings in the cost of the reactor, particularly at the preferred high reaction pressures. High reaction pressures afford the extremely important advantage of generating synthesis gas at a high pressure so that the synthesis gas needs little or no compression before being used in a high pressure hydroconversion process such as hydrocracking or hydrotreating. Also, $CO_2$ is more economically removed from raw hydrogen generated at the preferred high pressures in accordance with the present invention because the high pressure $CO_2$ can be removed from the hydrogen by absorbing the $CO_2$ into a physical absorbent such as methanol or propylene carbonate as opposed to the more expensive means of removing $CO_2$ at low pressure using a chemical absorbent such as an amine.

In the process of the present invention, it is preferred to add an oxygen-containing gas such as air or molecular oxygen to the reaction zone to burn a portion of the organic feed material with steam to form synthesis gas and carbon oxides. The heat for the reaction can also be supplied by heating the steam fed to the reaction zone to a sufficiently high temperature to supply the required amount of heat for the endothermic reaction of steam plus organic material to form synthesis gas.

The present invention operates not only to convert sewage solids to synthesis gas, but also operates to remove inorganic materials from aqueous sewage effluent streams and to utilize the inorganic materials as nutrients in the production of plants, which plants can then be converted to synthesis gas.

The conversion of organic feed material, particularly solid wastes and plants, to synthesis gas in accordance with the present invention operates as a heretofore unharnessed use of the sun's energy. The sun puts a great deal of radiant (as opposed to thermal) energy into the constituents that make up organic feed materials such as solid wastes, but in the past, the energy of solid waste has generally not been utilized in the United States and instead, solid waste has mostly been a nuisance and sanitation problem.

Living plants manufacture carbohydrates from carbon dioxide and water in the presence of sunlight, nutrients and chlorophyll by means of a complex series of reactions (heat and nutrients are also needed). Radiant energy is an important factor in the transformation. The transformation process is commonly known as photosynthesis. The carbohydrates produced by the photosynthetic process in plants can be represented by the general formula $$C_a(HOH)_b$$

Using the general formula of a carbohydrate, an abbreviated chemical equation to represent photosynthesis can be written as follows:

$$aCO_2 + bHOH \xrightarrow{h\nu} C_a(HOH)_b + aO_2$$

The photosynthesis of a specific carbohydrate, glucose, may be represented by the equation:

$$6CO_2 + 6HOH \rightarrow C_6H_{12}O_6 + 6O_2 - 671 \text{ kcal.}$$

As is indicated by the $-671$ kilocalories after the above equation, radiant energy received from the sun is stored in carbohydrates such as the simple glucose carbohydrate in the above equation.

In the process of the present invention, clean hydrogen which has a high amount of "stored" energy is produced from material including carbohydrates such as plants or certain solid wastes. Thus, it may be noted that if the hydrogen produced in accordance with the present invention is burned with oxygen, there is a release of about 52,200 B.t.u.'s per pound of hydrogen. The hydrogen is obtained from a carbohydrate (for example) by reaction of the carbohydrate with $H_2O$ requiring a heat input of about 6,600 B.t.u.'s per pound of hydrogen produced. The other 45,600 B.t.u.'s per pound of hydrogen is put in by photosynthesis, i.e., by the sun. Thus, about 87 percent of the stored energy in the hydrogen produced in the present invention comes from the sun—the process of the present invention adds only another approximately 13 percent of the hydrogen's stored heat energy.

The plants which are grown utilizing the inorganic nutrients in the sewage according to the process of the present invention can be grown in soil or in water. Preferably in the process of the present invention, the plants which are grown utilizing the nutritional value of the inorganic material in the sewage effluent water are grown in a body of water exposed to sunlight such as in a large pond. Various plants can be grown absorbing and utilizing the nutritional value of the inorganic material in sewage effluent water streams. The growth of algae plants is particularly preferred because of the relative ease with which the algae is grown and because of the high protein content of the algae, thus increasing the flexibility of the process of the present invention. For example, the algae can be used as a food supply for humans, but more generally, the algae preferably would find use as a food supply for lower animal forms such as cows or pigs or other farm animals.

According to a particularly preferred embodiment of the present invention, a process is provided for producing synthesis gas and food which comprises separating solid material and an aqueous stream containing inorganic nutrients from sewage, using the aqueous stream as a source of nutrients to aid in growing plants, using at least a portion of the plants which are grown as a source of animal food, collecting solid waste material from the animals, and reacting at least a portion of the solid waste material from the animals and at least a portion of the solid material separated from the sewage with steam in a reaction zone to produce synthesis gas.

We have found that solid sewage material is converted at an unexpectedly high rate to synthesis gas when the solid waste material is contacted with steam in the presence of an alkali metal catalyst at an elevated temperature. We have found that the rate of conversion is particularly fast when a potassium carbonate catalyst is used to accelerate the reaction rate. The solid waste material separated from the sewage for reaction with steam in the synthesis gas reaction zone in the process of the present invention preferably contains at least 10 weight percent oxygen combined with carbon and hydrogen and preferably contains less than 5 weight percent sulfur.

Although the algae grown in accordance with the tertiary sewage purification step of the present invention is preferably used for animal or human food in accordance with one embodiment of the present invention, in accordance with a more usual and preferred embodiment of the present invention, the algae which is grown is used as a feedstock for synthesis gas generation. The term "algae" is used herein to cover a wide variety of unicellular or polycellular plants which live in fresh or salt water and are distinguished from fungi by the presence of chlorophyll and response to photosynthesis as seaweeds, kelps, and agar-agar. Kelp is one preferred type of algae or plant for growth according to the tertiary sewage purification step of the present invention. Dried kelp is a fertilizer containing about 1.6-3.3 percent nitrogen, about 1-2 percent phosphoric oxide, and about 15-20 percent potassium oxide. Thus, it is apparent that the kelp requires nitrogen and phosphorus and will remove these constituents from water if present in the water in a suitable form. The kelp also assimilates potassium which in turn is advantageously used in the overall process of the present invention as potassium, and particularly, potassium carbonate has been found to be a very good catalyst agent for the synthesis gas generation step in the process of the present invention.

BRIEF DESCRIPTION OF THE DRAWING

The drawing is a process flow diagram schematically indicating preferred embodiments of the present invention.

DETAILED DESCRIPTION OF THE DRAWING

Referring now more particularly to the drawing, sewage material is fed as indicated by line 1 to sewage treatment zone 2. Sewage treatment zone 2 preferably operates substantially in accordance with a sewage treatment plant having at least primary treatment facilities and aerobic secondary treatment facilities. Solids from the sewage treatment in zone 2 are passed via line 10 to synthesis gas production zone 12.

Aqueous effluent from sewage treatment zone 2 is passed via line 3 to plant pond 4. Preferably, the aqueous stream passed via line 3 to plant pond 4 is withdrawn from a secondary aerobic treatment step in sewage treatment zone 2. The aerobic treatment step operates to decompose organic material present in the liquid sewage so that carbon dioxide and $H_2O$ is formed from the organic material. However, the inorganic material in the aqueous sewage is essentially unattacked by the air or oxygen which is passed through the aqueous sewage in the aerobic treatment step. Thus, the water from the aerobic treatment step contains various salts or inorganic species such as nitrates and phosphates. These inorganic species left in the water after the aerobic treatment are utilized in the process of the present invention in the plant growth pond or in general, as nutrients for plant growth in zone 4 in the process of the present invention. As the plants utilize the inorganic nutrients, the inorganic material is absorbed into the plants and removed from the water. Thus, the water is purified in zone 4 as the water passes through the pond or through a bed of soil while simultaneously the inorganic contaminants in the water are utilized as nutrients for plant growth. Purified water is withdrawn from zone 4 as indicated by arrow 7. The water withdrawn via line 7 typically will contain residual amounts of inorganic species as the plant growth will, of course, not completely deplete the water of minerals.

Oxygen is given off from the plant growth zone as indicated by arrow 6. The oxygen results from the photosynthesis reaction as previously indicated; namely,

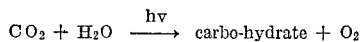

Plants are periodically taken from zone 4 as by harvesting or skimming the plants from the pond in that instance where the plants are grown on the surface of a pond. The plants are passed via line 8 and then via line 9 to synthesis gas production zone 12.

In the synthesis gas production zone, the plants fed via line 9 and the sewage solids fed via line 10 are reacted with steam added via line 20 to produce hydrogen and carbon oxides. The carbon dioxide formed in the synthesis gas production is advantageously passed, at least in part, via line 5 to zone 4 to increase the available carbon dioxide for plant growth in zone 4.

In addition to the plant feed to the synthesis gas production zone and the sewage solids feed, various other feeds may be introduced to the synthesis gas production zone, particularly animal solid waste via line 16 in zone 15 and various other solid wastes via line 11. The various solid wastes and other feed materials which can be converted to synthesis gas in zone 12 and the manner of carrying out the reaction in zone 12 are described in my copending application Ser. No. 34,834, entitled "Catalytic Hydrogen Manufacture," filed May 5, 1970, the disclosure of which application is incorporated by reference into the present patent application.

An alkali metal catalyst can be added to the one or more reactors in zone 12 by introducing an aqueous solution of a salt of the alkali metal catalyst to the reactor. The alkali catalyst can also be impregnated onto or mixed with the feed material to the reactor before the feed material is introduced to the synthesis gas reactor in zone 12.

The reaction of the feed material with steam to form hydrogen is an endothermic reaction. Therefore, heat must be supplied to the reaction zone. In accordance with a preferred embodiment of the present invention, heat is obtained by burning a portion of the solid waste feed with oxygen introduced to the reaction zone. In the case of hydrogen production for ammonia synthesis, it is preferred to use air as the source of oxygen to the reaction zone so that a mixture of nitrogen and hydrogen can be produced for ammonia synthesis. When relatively pure hydrogen is required, then it is preferred to use molecular or purified oxygen as the oxygen source. Heat can be supplied to the reaction zone by other means as, for example, direct input of heat to the reaction zone by means of heating coils or hot tubes. Also, the overall heat balance may be made by heating the steam to the reaction zone to a high temperature substantially above that temperature to which the steam can be heated by simply recovering heat present in the effluent from the reaction zone.

The sanitary residue remaining from the waste feed material can be removed from the lower part of the reactor used in zone 12. The sanitary residue is withdrawn from zone 12 as indicated by line 17. Mechanical apparatus and means used for the reaction of carbonaceous material such as coal and similar material can be adapted to the process of the present invention wherein material such as solid wastes are reacted with steam and a sanitary residue or ash remains. Thus, it is apparent that various mechanical schemes can be used for the reactor in the process of the present invention.

Synthesis gas production zone 12 typically includes a reactor vessel followed by a heat recovery zone and gas purification and CO shift conversion as described in more detail in my copending application Ser. No. 34,834, entitled "Catalytic Hydrogen Manufacture," filed May 5, 1970.

According to a preferred embodiment of the present invention, at least a portion of the plants produced in zone 4 are passed via line 8 and then via line 14 to animal growth zone 15. As indicated schematically in the drawing, small animals can be thought of as the input to animal growth zone 15 with large animals via line 19 being thought of as the output. When zone 4 is used to grow algae, the plant food is particularly desirable as animal food because of the high protein content of the algae. Solid wastes from the animals grown in zone 15 can, of course, be used as fertilizers, but the process of the present invention can also utilize the animal solid wastes as a feedstock for synthesis gas production in zone 12.

EXAMPLES (1) Fifty grams of organic feed material was charged to a one-liter quartz reactor. The organic feed material used in this instance was simulated solid municipal waste (simulated ordinary garbage and thus also similar to the solids in sewage), composed of 50 weight percent paper, 10 weight percent sawdust, 3 weight percent wool, 2 weight percent plastic, 10 weight percent cotton, 10 weight percent iron, 2 weight percent aluminum, and 13 weight percent food peels such as organic peels, etc. The oxygen content of this particular organic feed material was approximately 50 percent by weight excluding the metallic materials, i.e., iron and aluminum in the reactor charge.

Fifty-three milliliters of $H_2O$ was added to the quartz reactor over a four-hour period. The internal reaction zone in the reactor was maintained at a temperature of about 1200 to 1400° F. during most of the reaction time. No catalyst was used in this laboratory run.

Over the four-hour period, the total gas production was approximately 22 liters. The maximum gas production rate during the four-hour run period was about 10 liters per hour. The gas produced contained about 60 volume percent hydrogen with the remainder being mostly $CO_2$ and CO.

Remaining from the 50 grams charge to the reactor was 11.8 grams of residue. 6.3 grams of this residue was iron and aluminum. The carbon, hydrogen, and oxygen elemental analysis of the organic residue was about 85 weight percent C, about 1.4 weight percent H, and about 14 weight percent O.

The above results illustrate that solid waste-type material can be converted to substantial amounts of raw hydrogen with the simultaneous production of a residue which is sanitary because of the high temperature treatment of the solid waste material and the breaking down of the solid waste material into various constituents. The results also illustrate that the hydrogen can be produced at a fairly high rate; the rate of hydrogen production from the garbage was surprisingly found to be considerably higher than the rate of hydrogen production from carbon by reacting carbon with $H_2O$ under similar temperature conditions.

(2) In a subsequent laboratory run, 50 grams of simulated solid municipal waste having the same composition as in the preceding example was reacted with steam in the presence of 16.6 weight percent potassium carbonate catalyst based on the 50 grams of solid municipal waste feed. The alkali metal catalyst resulted in a surprising increase in the hydrogen gas production. Compared to 22 liters of gas produced over 4 hours in the preceding example with no catalyst, 54.6 liters of gas were produced in this run using the alkali metal catalyst. Compared to a maximum gas production rate of 10 liters per hour in the preceding example, the gas production rate in this run using an alkali metal catalyst was 24 liters per hour.

The composition of the gas produced was approximately as follows:

| | Volume percent |
|---|---|
| $C_1$ | 5.2 |
| $C_2$–$C_5$ | 2.1 |
| CO | 6.8 |
| $CO_2$ | 21.6 |
| $H_2$ | 64.3 |

The above gas analysis was based on approximately 18.1 liters of gas collected while the reaction zone temperature was raised, by electrical heating of the reactor, from about 800 to 1200° F. When heating the solid waste feed from 1200–1400° F., 27.6 liters of gas was recovered having the composition shown below:

| | Volume percent |
|---|---|
| $C_1$ | 0.5 |
| $C_2$–$C_5$ | Nil |
| CO | 17.2 |
| $CO_2$ | 18.7 |
| $H_2$ | 63.6 |

The residue recovered after this run was about 12.4 grams composed of 5.6 grams iron and iron oxide, .8 gram aluminum and aluminum oxide, 5.0 grams potassium carbonate, and 1.0 gram water insoluble ash.

(3) Another run was carried out using 50 grams of simulated solid municipal waste having the same composition as in the preceding examples, but using 10 weight percent sodium carbonate catalyst. The sodium carbonate catalyst was found to be very effective in increasing the rate of hydrogen production. The maximum rate of hydrogen production during this run was 34 liters per hour compared to only 10 liters per hour in the Example 1 above, wherein no catalyst was used. The total amount of hydrogen-rich gas produced in this run was 47.1 liters.

The temperature range during this run was essentially the same as that in the preceding examples with the maximum temperature being 1425° F.

The residue recovered after the run was about 12.2 grams composed of 5.4 grams iron and iron oxide, .8 gram aluminum and aluminum oxide, 1.5 grams water insoluble ash, and 3.2 grams sodium carbonate.

The amount of $H_2O$ added during this run was about 16 milliliters per hour, compared to 14 milliliters per hour for the previous example wherein the potassium carbonate catalyst was used.

(4) Fifty grams of dried Milwaukee sewage, commonly referred to as Milorganite, was impregnated with about 10 weight percent sodium carbonate and then reacted with steam at a temperature within the range of about 1200–1440° F. The reaction was carried out over a period of about 6 hours and 39 liters of gas was produced. The gas contained about 63 volume percent hydrogen. 12.3 grams of residue remained. About 2.5 grams of the residue was soluble in water and could be processed to recover a large amount of the sodium carbonate catalyst for re-use in the catalytic reaction.

(5) Ten grams of Elodea, an aquatic weed, was impregnated with 8.3 percent $K_2CO_3$ and then reacted with steam at 1200° F. The reaction went nearly to completion in less than one hour. 12 liters of gas containing 70 percent $H_2$ was produced. 2.7 grams of residue remained, of which .7 gram was insoluble in $H_2O$.

(6) Calculated approximate numbers for the application of the process of the present invention in a preferred embodiment to the simultaneous production of synthesis gas and food are as follows:

200 tons per day of sewage feed to the sewage treatment plant, yielding 8 tons per hour aqueous effluent water containing nitrates and phosphates;

0.75 square miles of pond area for production of algae and purification of the sewage effluent water contaminated by the inorganic species;

20 tons per day sewage solids fed to the synthesis gas production zone for the production of one million SCF of hydrogen per day and with all the algae being used as animal feed;

4 tons of pork production per day.

Although various embodiments of the invention have been described, it is to be understood that they are meant to be illustrative only and not limiting. Certain features may be changed without departing from the spirit or scope of the invention. It is apparent that the present invention has broad application to the production of synthesis gas or gases comprising hydrogen from sewage solids with concomitant purification of inorganic contaminated aqueous effluents from sewage treatment facilities. Accordingly, the invention is not to be construed as limited to the specific embodiments or examples discussed but only as defined in the appended claims.

I claim:

1. A process for producing synthesis gas which comprises separating, from sewage, solid material and an aqueous stream containing inorganic nutrients, using the aqueous stream as a source of nutrients to aid in growing plants, and reacting at least a portion of the plants which are grown and at least a portion of the solid material separated from the sewage with steam in a reaction zone to produce synthesis gas.

2. A process in accordance with claim 1 wherein the sewage is subjected to primary and secondary sewage treatment and said solid material is separated from sewage during at least the primary treatment and said aqueous stream containing inorganic nutrients is withdrawn from the secondary treatment.

3. A process in accordance with claim 1 wherein the plants are grown in a body of water exposed to sunlight.

4. A process in accordance with claim 3 wherein the plants are algae.

5. A process for producing synthesis gas and food which comprises separating solid material and an aqueous stream containing inorganic nutrients from sewage, using the aqueous stream as a source of nutrients to aid in growing plants, recovering the plants as food, using at least a portion of the plants which are grown as a source of food for animals, collecting solid waste material from the animals, reacting at least a portion of the solid waste material from the animals and at least a portion of the solid material separated from the sewage with steam in a reaction zone to produce synthesis gas.

6. A process in accordance with claim 1 wherein at least a portion of the solid material separated from the sewage and at least a portion of the plants are contacted in the reaction zone with steam in the presence of an alkali metal catalyst selected from a group consisting of potassium carbonate and sodium carbonate.

7. A process in accordance with claim 6 wherein the alkali metal catalyst is potassium carbonate.

8. A process in accordance with claim 6 wherein the temperature in the reaction zone is maintained between 500 and 3000° F.

9. A process in accordance with claim 6 wherein the temperature in the reaction zone is maintained between 700 and 1600° F.

10. A process in accordance with claim 1 wherein a gas comprising oxygen is fed to the reaction zone and a portion of the organic feed material to the reaction zone is burned with the oxygen to provide at least a portion of the endothermic heat of reaction for the conversion of the organic feed material plus steam to synthesis gas.

References Cited

UNITED STATES PATENTS

| | | | |
|---|---|---|---|
| 3,471,275 | 10/1969 | Borggreen | 48—209 |
| 3,155,609 | 11/1964 | Pampel | 47—1.4 U X |
| 2,867,945 | 1/1959 | Gotoas et al. | 195—1 U X |
| 3,420,739 | 1/1969 | Bongers et al. | 47—1.4 X |
| 3,195,271 | 7/1965 | Golveke et al. | 47—1.4 |
| 3,520,081 | 7/1970 | Oswald et al. | 47—1.4 |
| 2,471,161 | 5/1949 | McCordic | 48—209 X |
| 2,126,150 | 8/1938 | Stryker | 48—209 U X |
| 969,733 | 9/1910 | Thomas | 48—209 X |
| 1,189,638 | 7/1916 | Testrup et al. | 48—209 |

JOSEPH SCOVRONEK, Primary Examiner

U.S. Cl. X.R.

47—1.4; 99—2 R, 149; 210—2, 15; 252—373

PO-1050
(5/69)

UNITED STATES PATENT OFFICE
CERTIFICATE OF CORRECTION

Patent No. 3,698,881      Dated October 17, 1972

Inventor(s) Robert J. White

It is certified that error appears in the above-identified patent and that said Letters Patent are hereby corrected as shown below:

Column 2, line 43, "$C_7H_{12} + 2.8O_2 + 2.1H_2O \rightleftarrows 6.3CO + .7CO_2 + 8.1H_2$" should read --$CH_4 + 1/2O_2 \rightleftarrows 2H_2 + CO$--.

Column 2, line 67, "pases" should read --gases--.

Column 2, line 68, "the present process" should read --the process--.

Column 3, line 25, "nitrition" should read --nutrition--.

Column 8, line 55, "organic" should read --orange--.

Signed and sealed this 1st day of May 1973.

(SEAL)
Attest:

EDWARD M. FLETCHER, JR.
Attesting Officer

ROBERT GOTTSCHALK
Commissioner of Patents